United States Patent [19]
Ritter

[11] Patent Number: 5,305,535
[45] Date of Patent: Apr. 26, 1994

[54] BULK MATERIAL REACTOR

[75] Inventor: Juergen Ritter, Stuttgart, Fed. Rep. of Germany

[73] Assignee: Nymic Anstalt, Schaan, Fed. Rep. of Germany

[21] Appl. No.: 688,520

[22] PCT Filed: Aug. 20, 1990

[86] PCT No.: PCT/EP90/01354
§ 371 Date: Jun. 11, 1991
§ 102(e) Date: Jun. 11, 1991

[87] PCT Pub. No.: WO91/02586
PCT Pub. Date: Mar. 7, 1991

[30] Foreign Application Priority Data

Aug. 19, 1989 [DE] Fed. Rep. of Germany ....... 3927417
Dec. 7, 1989 [DE] Fed. Rep. of Germany ....... 3940412

[51] Int. Cl.$^5$ ............................................. F26B 9/00
[52] U.S. Cl. ...................................... 34/164; 34/171; 34/178
[58] Field of Search ................. 34/164, 167, 168, 171, 34/172, 178, 241

[56] References Cited

U.S. PATENT DOCUMENTS

| 2,717,458 | 9/1955 | Shabaker | 34/171 |
| 2,766,534 | 10/1956 | Schaub et al. | 34/33 |
| 2,780,310 | 2/1957 | Schaub | 34/171 |
| 3,025,043 | 3/1962 | Ruelle et al. | 34/178 |
| 3,749,549 | 7/1973 | Henderson | 432/49 |
| 3,842,516 | 10/1974 | Speissegger et al. | 34/5 |

FOREIGN PATENT DOCUMENTS

| 3213664 | 10/1983 | Fed. Rep. of Germany . |
| 3411801 | 10/1985 | Fed. Rep. of Germany . |
| 89/07485 | 8/1989 | World Int. Prop. O. . |

Primary Examiner—Henry A. Bennet
Assistant Examiner—Denise L. Gromada
Attorney, Agent, or Firm—Foley & Lardner

[57] ABSTRACT

In a bulk material reactor comprising a reactor housing in which is arranged a travelling bed of 6,6' formed of bulk material 7,7', and a feed device 14-16-17 located on the top side, and a removal device 10 located on the underside of travelling bed 6,6,' as well as a gas inlet opening 2, and a gas outlet opening 3 located on various sides of travelling bed 6,6', the narrowing of gas-flow pathways through transfer device 10 is avoided and uniform flow-through pathways of equal length are provided for the gas flowing through the reactor whereby furthermore, travelling bed 6,6' is bounded along its lower side through staggered transfer plates 10 arranged in a cascade formation between which plates bulk material 7,7' collects to form an angle of repose 11 by means of which the trickling away of bulk material 7,7' is prevented while the system is stopped, whereby such transfer plates 10 can be moved backward and forward in such a way that motion in the transfer plates 10 permits bulk material 7,7' to fall therefrom, and whereby travelling bed 6,6' is designed on its top side with a surface 9 whose slope corresponds to that of staggered sloping transfer plates 10.

17 Claims, 7 Drawing Sheets

BULK MATERIAL REACTOR

The present invention relates to a bulk material reactor comprising a travelling bed that is formed from the bulk material and is arranged inside a reactor housing. The bulk material reactor furthermore features, on its upper side, a feed device, a removal apparatus located on the underside of the travelling bed, openings serving to admit gas into the reactor, and an opening serving to let gas exit from the reactor. The aforementioned travelling bed is bounded on its underside by plates that are staggered in cascade fashion to form an overlapping structure that extends toward the side walls of the reactor.

Conventional bulk material reactors of the above-mentioned type are used in a wide variety of applications, examples of which are their employment in the mechanical filtering of gas-borne particles, wherein the bulk material serves as the filtration medium, such a procedure involving the adhesion to the bulk material particles of any materials contained in the gas; the thermo-chemical treatment of the bulk material itself wherein the gas, which flows through the bulk material, serves as the purifying agent. The travelling bed of bulk material is designed in such a way that the same amount of bulk material is removed from the process at the lower end of the reactor as is introduced into the process at the top. This design provides that bulk material will always be renewed in a process comprising, for example, removal of the impurity-laden bulk material at the lower end of the travelling bed and redirection of bulk material, pursuant to a regeneration process, to the upper end of the travelling bed. Special applications may also require the entire removal of contaminated bulk material, and its replacement with completely new bulk material. Gas-based thermo-chemical treatment of bulk material requires an arrangement in which treated bulk material is removed at the lower end of the process, while fresh bulk material is introduced at the upper end of the travelling bed into the thermo-chemical treatment process.

In all applications of the reactor, the bulk material should ideally be permitted to travel as uniformly as possible along the travelling bed, the manner of its feed at the beginning of the process, and its removal at the end of the process, being as finely regulated as possible, an arrangment permitting the gas flowing through the bulk material to follow pathways that are as uniform in length as possible.

A number of disadvantages attend the use of prior art systems for removing bulk material from the travelling bed. Because such systems do not as a rule permit bulk material to be fed to or removed from the process in a sufficiently regulated manner, continuous or unbroken travel of material along the bed is precluded; material is rather transfered out of the process stream in a more or less discontinuous fashion. The designs of prior art material removal systems have also been known to significantly limit the size of the region through which the gas is able to flow, the effect of which being a considerable reduction of the cross section through which the gas is permitted to flow in the zone of the removal device, a situation that impinges on the uniformity of gas flow through the bulk material. These circumstances are particularly disadvantageous in prior art bulk material reactors wherein the gas is forced to flow against the direction in which bulk material moves along the travelling bed. Although basically advantageous, the process of causing gas to flow against the direction of movement of the travelling bed cannot be effectively achieved in the prior art bulk material reactors.

Disclosed in U.S. Pat. No. 2,776,534 is a bulk material reactor wherein the travelling bed is bounded at its lower boundary zones by means of staggered overlapping plates that permit gas to flow through the travelling bed against the direction of travel of the latter. The travelling bed is caused to travel by opening a shut-off device installed inside a discharge nozzle in the reactor. This procedure would naturally preclude precise regulation of the transport of material.

The object of the present invention is therefore, the improvement of a bulk material reactor of the kind first mentioned, in which bulk material is permitted to leave the travelling bed in a regulated manner, and in which gas flowing through the reactor is caused to flow through the material in the travelling bed in such a way that it follows uniform flow paths of equal length.

It is proposed that the object of the present invention be satisfied in a waste material reactor of the kind first mentioned, wherein the extent to which the plates are both separated from each other by vertical height, and overlap each other, cause the bulk material lying thereon to form an angle of repose that prevents such bulk material from flowing through the plates while the system is at a standstill, and whereby, furthermore, the above-mentioned plates are connected to a vibrating power source that imparts such a motion in the plates that bulk material falls from them, and whereby the plates are arranged along a sloping line that runs parallel to the sloping surface of the travelling bed.

The proposed bulk material reactor comprises a finely-adjustable system for removal of bulk material, which is implemented by setting the transfer plates in motion particularly whenever gas flows through the bulk material reactor in the direction opposite to the process direction. A rather large gas flow-through area is created, which, under certain circumstances, can be greater than the cross section of the bulk material reactor itself. This owes to the fact that the gas flow-through area is formed by the angle of repose of the bulk material itself, which occupies the individual steps of the cascade-forming staggered conveyor plate construction, and that such angular formations of bulk material are able to overlap each other. Cascade-like arrangment of the transfer plates would, in a prior art configuration of the travelling bed, lead to the establishment of flow paths of different lengths through the bulk material, since the gas flowing through an upper conveyor plate would follow a shorter path through the normally horizontally lying bulk material than would the gas flowing above a lower transfer plate. It is proposed in the present invention that this deficiency be addressed in that the surface of the bulk material slope away to the side in accordance with the graduation of the transfer plates. This object is achieved in a particularly preferred embodiment of the present invention by feeding the bulk material to the travelling bed from the top end in such a manner that the bulk material flows towards the lateral walls to form a bulk material angle that is typical of the bulk material being processed. It follows then that the slope of the graduated transfer plates will be adjusted to accord with the type of bulk material being processed, and will more or less correspond to the bulk material angle assumed by the bulk material as it flows into position. The proposed bulk material reactor, therefore, offers the following advantages: that by means of the removal device the removal of bulk material can be finely regulated; the cross section of gas flow can be prevented from constricting; and the gas streaming through the travelling bed can be caused to follow uniform flow paths of equal length.

The proposed bulk material reactor can be operated with a wide variety of filter media, an example of which can be inert ceramic material or certain kinds of ash particles, which can for example, be a by-product of power plant operation and are suitable for removing fine dust particles from gas. After filtering out the dust particles, the filter medium is disposed of and fresh filter medium is prepared for use in the ongoing process.

The design of the proposed bulk material reactor admits use of travelling beds of varying heights which permits, for example, a higher travelling bed to be created for coarser grained material than as would be required for very fine-grained material.

The proposed bulk material reactor is suitable for use in conjunction with all of the reactors of the above-mentioned type, and can be used for absorbing impurities present in bulk material in the thermo-chemical treatment of bulk material by using the gas that is caused to flow through such bulk material. The proposed bulk material reactors can be used without any problem in operating environments with temperatures ranging up to 1000° C. and are also suitable for removing sticky or adhesive dusts.

In one preferred configuration of the present invention, the transfer plates are designed to be moved back and forth in their longitudinal direction. In order to accomodate this arrangement, the width of the bulk material reactor is preferably less than its depth, and the transfer plates, along with other movable parts, lie with their longitudinal dimension aligned in the direction of the depth of the bulk material reactor, and extend in staggered fashion over the breadth of the bulk material reactor.

One particularly preferred configuration of the present invention comprises that the transfer plates be connected to a vibrating power source located on the outside of the reactor housing. The vibrating power source in this configuration, is constructed according to prior art vibration technology, and serves to impart motion either to individual transfer plates or to a series of transfer plates that range across the inside of the reactor.

In one preferred embodiment of the present invention, the travelling bed has a symmetrical structure comprising two sloping surface regions. Arranged in similarly symmetrical fashion are two groups of transfer plates which slope away, cascade-like, toward the walls of the reactor housing. In this arrangement, the sloping surfaces of the travelling bed create a uniform profile across the depth of the reactor housing, with two sloping surfaces of the travelling bed sloping away to the sides of the reactor housing. The sloping surfaces of the travelling bed correspond preferably to the angle of repose formed when a particular bulk material is being used, and obviate the need for special procedures to adjust the surface of the travelling bed to accord with the shape of the bulk material. Accordingly, the slope of the cascade-like staggering of the transfer plates is adjusted to accord with that of the bulk material being used so that the slope of such plates follows the angle of repose of the bulk material. Provision of an element in the centre of the reactor housing in order to divide the travelling bed, will preclude the development of irregular flow conditions. It is preferable that the width of the dividing element be such that the size of the angle of repose of the bulk material settling on top of the uppermost transfer plate comes very close to the angle formed on top of the lower transfer plates. Moreover, the presence of such an element in the centre of the reactor ensures that the same amount of gas will be able to flow across each gas entry area.

Creation of a sloping surface for the travelling bed requires that a feed device, which extends along the length of the bulk material reactor, be provided in the centre thereof, in order to supply a volume of bulk material equivalent to that which will be removed through the transfer plates. The central input of bulk material can be accomplished with the aid of a feed trough that runs along the entire length of the reactor and is provided along its longitudinal direction either with a continuous longitudinal slot or with a plurality of openings. It is preferable that the feed trough be set in motion by means of a vibrating power source. The present invention, can however, admit other means of distributing material along the length of the feed trough, an example of which is use of a feed auger. Uniform feed of the above material to be processed can be facilitated if, arranged underneath the feed trough, is a distribution plate above which guide plates are arranged on each side so as to permit, when the system comes to standstill, a complete angle of repose to form on top of the distribution plate. It is also contemplated that the distribution plate can be driven by means of a vibrating power source. This arrangment permits the bulk material to be fed to the travelling bed in a regulated fashion on top of the surface of the latter in accordance with the angle of repose of the material to be used without forming waves on top of such surface.

Use of bulk material of non-uniform grain size, combined with a relatively steeply sloped travelling bed surface, gives rise to the danger of segregation according to grain size, if for example, bulk material is caused to fall away from the middle of the reactor housing toward the side of the housing over the angle of repose of the bulk material. If bulk material comprising a wide range of grain sizes, is to be processed, the tendency of the grains to segregate can be counteracted if, arranged above the transfer plates across the breadth of the reactor housing, are dividing walls, which are arranged in series such that their upper edges slope gradually away for the purpose of forming the sloping surface of the travelling bed. Provision of such dividing walls permits the reactor to be filled in a unique manner comprising that the compartment directly adjacent the feed device be filled first until the bulk material overflows its dividing wall to fall into the next compartment. By this method, the bulk material, which is fed into the reactor, will fall into a given compartment, which after being filled up, will overflow, to cause bulk material to flow into the adjacent compartment. In order to prevent the formation of mounds of bulk material on top of individual compartments, it has proven to be effective if the line connecting the upper edges of the division walls have a somewhat sharper slope than the naturally occurring angle of repose of the bulk material itself.

In a particularly preferred configuration, a dividing wall is arranged in conjunction with each transfer plate, to cause a vertical compartment to be created above each transfer plate, such compartments being arranged, one after another, along the entire width of the reactor and also extending over the entire length of the reactor.

It is also possible to arrange a series of travelling beds inside a single reactor housing and to separate such travelling beds by means of dividing walls. In general however, it is more effective if completely equipped reactors, together with reactor housing, are combined together in parallel or series arrangement. Reactor units, which are arranged in series, can then be loaded with varying kinds of bulk material, and comprise travelling beds of different heights in order, for example to permit a gas that is to be purified to pass through a number of different bulk materials during the purification process. When processing different kinds of bulk material in series-arranged, and vertically-arranged reactor units, it is necessary that each reactor possess its own feed and removal assemblies.

The removal assembly forming part of proposed reactor comprises preferably a series of removal troughs which, being arranged in at least two planes, are separated by intermediate spaces and overlap each other across the full extent of the openings between transfer plates. This arrangement permits all of the falling bulk material to be caught in the removal troughs, and then to be transported away. This advantageous removal arrangement permits flow of gas through the troughs, which allows removal troughs to be arranged above the gas inlet opening of the reactor housing.

If dust-producing bulk materials are to be processed, it can be helpful if the removal troughs are arranged beneath the transfer plates in a staggered formation that mimics the slope of the staggered transfer plates. This arrangement causes the bulk material, which falls through the transfer plates, to fall the same distance at all levels. Restriction of product fall height counteracts any tendency to produce dust.

The removal troughs are preferably driven by a vibrating power source, which in this case is located outside the reactor housing and can, if necessary, be used in combination with the power source that serves to vibrate the transfer plates. The proposed bulk material reactor features the greatest number of advantages for the operation of the reactor in counterstream, but is also well suited for same-directional flow operation.

The proposed bulk material reactor can be fitted with a fill-level indicator that serves to indicate the level to which bulk material has been loaded into the reactor housing. Such a device serves at reactor start-up to ensure that a travelling bed of appropriate height has been formed by the feed device. Transport of bulk material in the travelling bed can be continuous or intermittent. In view of the changing conditions effecting gas loading in a filtration operation, or the loading of bulk material in a thermo-chemical treatment operation of the bulk material itself, a measurement device can be installed in order to measure the difference in pressure in the gas while entering and leaving the travelling bed, whereby connected to such measurement device is a control unit that acts to regulate the feed, or as the case may be, removal of bulk material through the feed and removal mechanisms, the degree of regulation depending on the measurement signal that is produced by the device used to measure pressure difference. The proposed bulk material reactor can advantageously have a modular construction, and is suitable for arrangement together with a plurality of other complete modular reactors. In an arrangement comprising the adjacent installation of a plurality of completely modular reactors, in which the latter are arranged in parallel, such reactors have, preferably, common gas feed and gas outlet lines. In this arrangement, it is advantageous, in order to achieve uniform gas flow conditions in the parallel-arranged reactors, if the cross section of the gas feed line moving away from the inlet end narrows continuously along the breadth of the reactors and if the cross section of the gas outlet line widens conically toward the gas outlet end.

The reactors can also be arranged on top of each other, and can as presently contemplated, be connected together in either parallel or serial fashion. If the reactors are serially connected, the entire system is provided with a gas inlet and a gas outlet line at the appropriate endpoints of the arrangement. When the reactors are connected in parallel, each reactor in the vertical arrangement possesses its own gas inlet and gas outlet line. Both gas inlet and outlet lines are designed, preferably to permit their connection as auxiliary components to the reactor housing, an arrangement that allows the modular design of the reactor units and their interposed or end-mounted gas lines to afford flexibility during installation of the proposed bulk material reactor. System flexibility is enhanced by prefabricating the reactor housing, and grouping together in one unit all of the functioning or moving components of the reactor along with their drive apparatus. In this arrangement however, the drive source remains on the outside of the reactor housing. Depending on the tendency to flow of the bulk material employed, the advantage of the present invention can be increased if the transfer plates are sloped relative to the horizontal. Removal of slow-flowing bulk material from the process stream is facilitated when the transfer plates slopes downwardly toward the edge over which the bulk material falls. The ideal slant angle in this case is 5°. Wherever easily flowing bulk material is to be used in the process, however, the unintended trickling out of material can be effectively prevented if, at leas during stoppages, the slope of the transfer plates rises toward the free edge of such plate. Before the plates are again set in motion, the plate should be returned to its horizontal attitude. It is in any case advantageous if the transfer plates are designed to slant, and so permit the transfer plates to assume various angles according to either the type of operation contemplated, or the kind of bulk material to be employed.

The present invention will next be described in greater detail with the aid of drawings of different configurations of the proposed system. Shown are.

Figure 1:
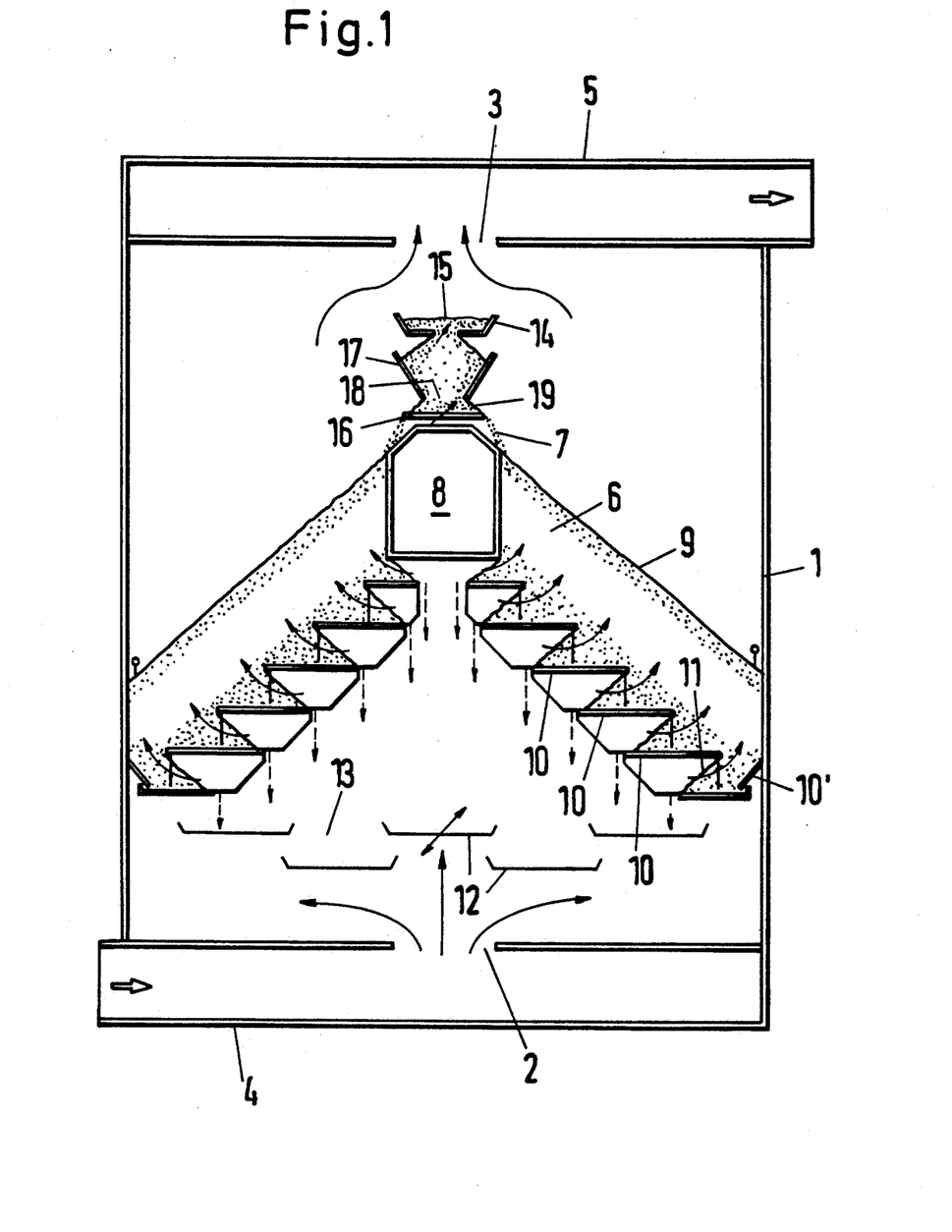
FIG. 1: a cross sectional view of the proposed reactor as viewed across the depth of said reactor.

FIG. 1 shows a rectangular reactor housing 1 that comprises a gas inlet opening 2, situated in the floor, and a gas outlet opening 3, situated on the upper side of the reactor. Connected to gas inlet opening 2 is a gas feed line 4, and to gas outlet opening 3, a gas outlet line 5.

Created inside reactor housing 1 is a travelling bed 6 comprising bulk material 7, which slopes away from a central piece 8, to follow a surface 9 that slopes toward the side walls of reactor housing 1.

Situated on the underside of travelling bed 6 are six levels of transfer plates 10, that overlap from the middle of the reactor to form a slope that extends toward the side walls of the reactor housing and follow a sloping line that runs parallel to surface 9 of travelling bed 6. The height separating transfer plates 10 from each other as well as their degree of overlap permit the formation upon each transfer plate of a complete angle of repose 11 of bulk material 7, which prevents, during process stoppages, any bulk material from falling through the transfer arrangement comprising transfer plates.

In order to regulate removal of bulk material 7 from travelling bed 6, transfer plates 10 are connected to a (not illustrated) vibrating power source by means of which they can be set into vibratory motion. This arrangement causes the angle of repose of the bulk material to change sufficiently so as to permit bulk material to fall over the front edge of transfer plate 10. The fallen bulk material 7 is carried away by means of a removal device comprising removal troughs 12 whose arrangement allows the existence of intermediate spaces 13. Removal troughs 12 overlap each other in their multilayer arrangement, and thus are able to cover all of the openings provided between transfer plates 10.

This method ensures that all of the bulk material having dropped from transfer plates 10, will be caught by removal troughs 12 and be transferred away in the longitudinal direction of the reactor housing. The advantage of arranging the removal troughs 12 on several levels is that of permitting gas to flow through the removal system, an advantage that permits installation of the latter above gas inlet opening 2, as FIG. 1 illustrates.

Bulk material 7 is fed to travelling bed 6 with the aid of a feed trough 14 that is arranged centrally above central piece 8 and which features in the present example a continuous central slot 15, and can be caused to vibrate in the longitudinal direction. Situated beneath slot 15 is a distribution plate 16, which can also be set in vibratory motion in the longitudinal direction. Arranged above distribution plate 16 are two guide plates 17, which converge to form a funnel-like structure, and a slot 18, whose width permits, during process stoppage, the formation upon both sides of distribution plate 16 of a full angle of repose 19, which prevents bulk material 7 from flowing onto travelling bed 6 during stoppages. Only when distribution plate 16 is set into motion can bulk material 7 begin to fall from both sides of distribution plate 16 and be distributed in accordance with the bulk properties of such bulk material over surfaces of travelling bed 6, whose slope is defined by the angle of repose of the bulk material.

In FIG. 1, the extended arrows indicate the flow paths followed by the gas after leaving gas inlet opening 2, and flowing through angle of repose 11, which forms the zone through which the gas flows into travelling bed 6. After flowing through travelling bed 6, the gas collects in the vicinity of gas outlet line 5. This arrangement is suitable for an operation in which the gas is intended to flow against the direction of flow of the bulk material. If the system is used to filter gas, impure gas flows through gas inlet opening 4, into reactor housing 1, and leaves the latter through gas outlet opening 5, as clean gas. In order to prevent bulk material 7 from flowing over the edge of lower transfer plate 10, guard plates 10' are arranged to extend from a region situated directly above the lowest transfer plates 10, to an area situated directly above the very lowest transfer plate 10.

Figure 2:
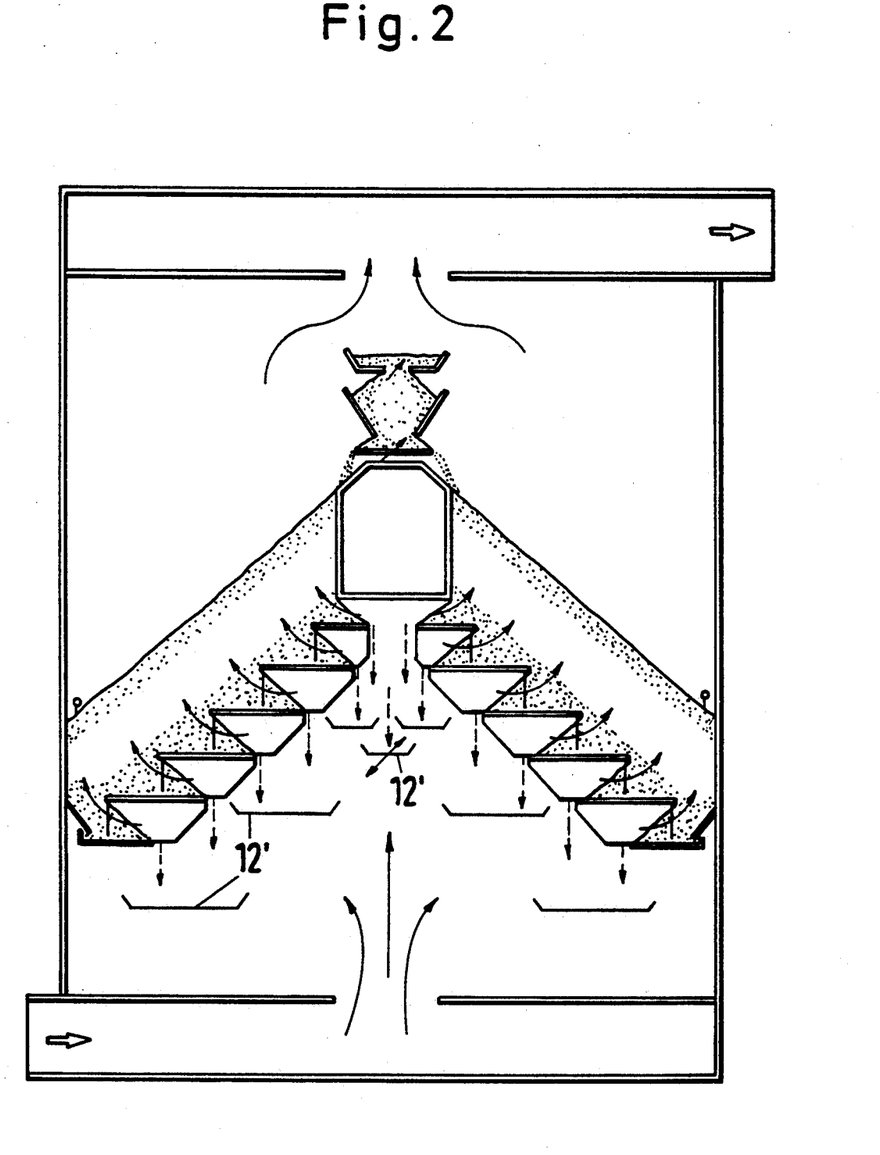
FIG. 2: the cross sectional view shown in FIG. 1 through a reactor comprising a modified material removal arrangement.
Figure 3:
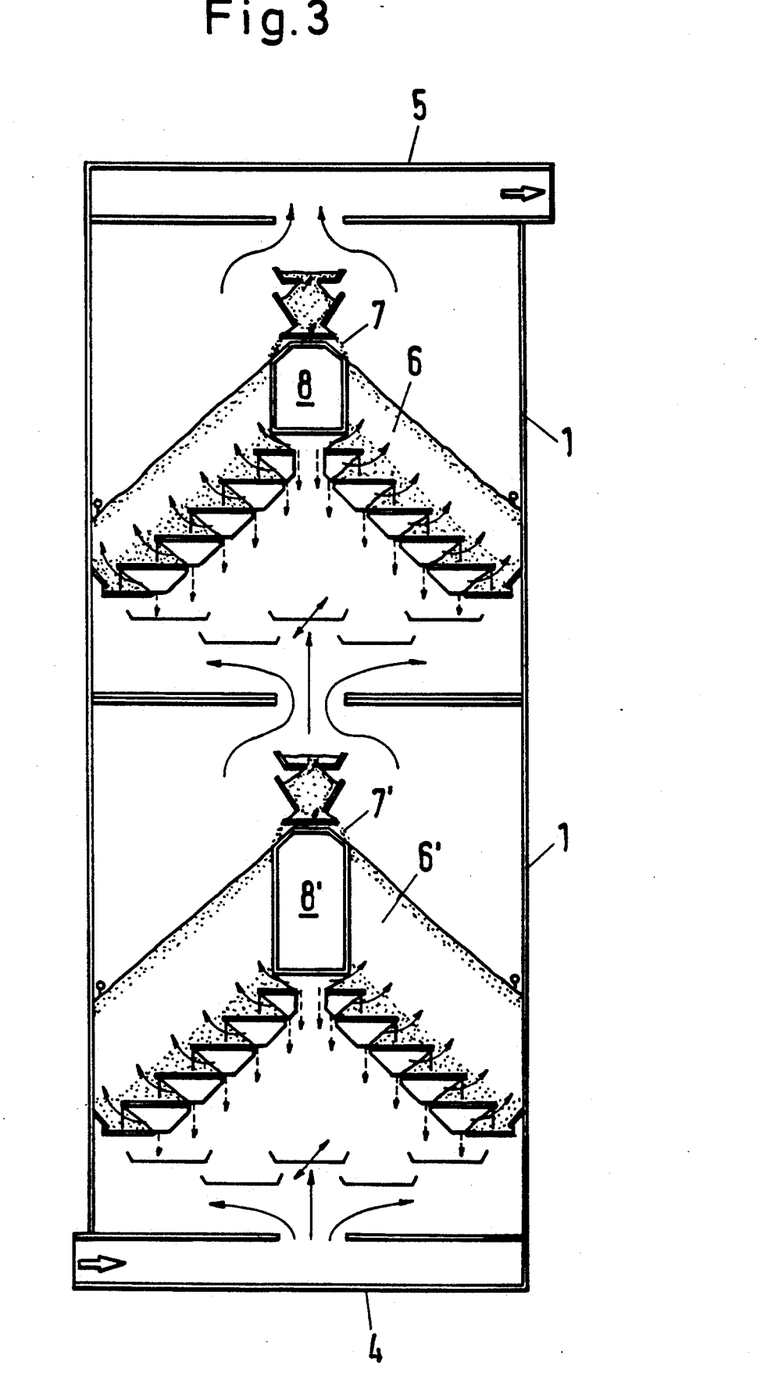
FIG. 3: a vertical arrangement of two complete reactors that are connected in series.

The reactor shown in FIG. 2 corresponds in all essential aspects to the reactor illustrated in FIG. 1, the sole differences between the two reactors being that removal troughs 12' are arranged in four levels, whereby, however, three of such removal troughs, 12' are arranged more or less according to the slope of transfer plates 10, and gradually overlap each other such that their arrangement is also symmetrical. The central intermediate space situated between both upper removal troughs 12' is covered by a removal trough 12' that is arranged in the middle directly below both troughs in such a way that removal troughs 12' extend across the effective integral width of the reactor without leaving a space through which material can fall. The arrangement of removal troughs 12' has, by comparison with the arrangement of removal troughs 12 shown in FIG. 1, the advantage that the height through which bulk material 7 is able to fall is limited, which is an important consideration if dust-producing bulk materials 7 are to be used. FIG. 3 shows an arrangement of two modular vertically arranged reactor housings, 1 wherein the design of both the reactors corresponds to that described in FIG. 1. Since both reactors are connected together in series, only lower reactor housing 1 comprises a gas inlet line 4, and only upper reactor housing 1 features a gas outlet line 5. In addition, it will be appreciated that central piece 8', which is comprised by lower reactor housing 1, is designed with a greater vertical height in order to correspond effectively to a travelling bed 6', which also has a greater height. The higher travelling bed 6' can for example, comprise a coarse-grained bulk material 7' for the purpose of separating out the larger dust particles present in a dust-laden gas that is loaded with dust, which enters through gas inlet opening 4, into the lower reactor. The now pre-cleaned gas enters the upper reactor in which very fine dust particles are filtered out with the aid of a flat filter bed comprising fine-grained bulk material 7. In another application of the proposed system, the lower reactor can be provided with a layer of material whose grain size is appropriate for dust removal purposes, while any harmful gaseous material still remaining in the gas can be adsorbed in the upper reactor with the aid of an adsorbing agent. Use of bulk material 7, which has a finer grain structure, and therefore offers increased resistance to the flow of gas, requires that the height of travelling bed 6 be reduced.

Figure 4:
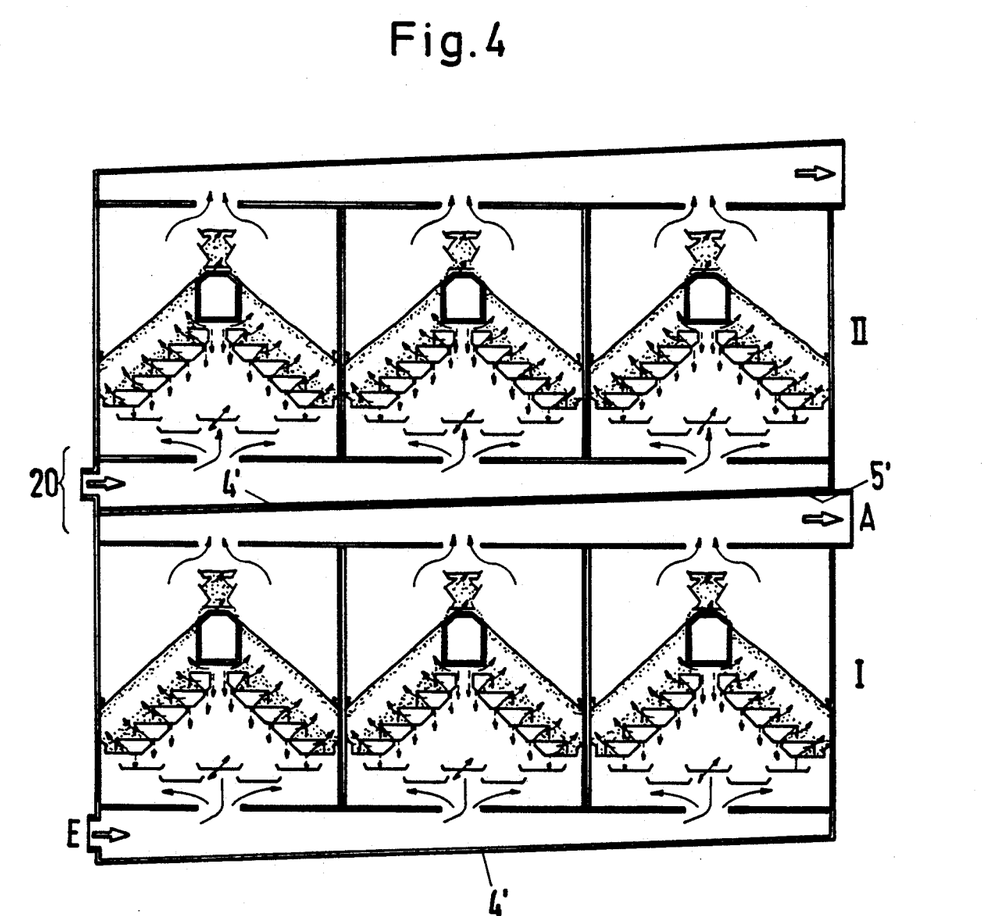
FIG. 4: a contiguous arrangement of two levels, each comprising three reactors that are connected in parallel.

FIG. 4 shows three reactor housings 1 that are arranged in two levels, I and II, and are connected in parallel via modified gas inlet line 4' and a gas outlet line 5'. Over the breadth of the reactors, gas inlet line 4' is continually reduced in its cross section as viewed from inlet point E, and gas outlet line 5' continuously increases in its cross section towards an outlet end A. This gradual change in cross sectional size is intended to normalize the pressure levels prevalent in the contiguously-arranged reactors, so that the gas is able to flow in a uniform manner through such contiguously-arranged and parallel-connected reactors.

The design of vertically-arranged reactors also affords the advantage that the gradually-changing conical cross sections of contiguous gas outlet line 5' of lower level I, and gas inlet line 4' of upper level II, complement each other, which enables both levels to be combined into a modular unit 20.

Clearly, the reactors on levels I and II, can also be arranged serially which would obviate the need to construct unit 20.

It will be appreciated that the above-described configurations can be used in conjunction with both types of structure. This principle applies equally to the transport of bulk material, which does not necessarily have to be effected with the use of vibratory mechanics in order to ensure the uniform feed of bulk material 7, 7' to travelling bed 6, 6'. Bulk material can also be fed into feed trough 14 with the aid of an auger, or via a transfer means employing similar mechanical principles. It is also possible to completely omit distribution plate 16 if the flow characteristics of bulk material 7, 7' already favour uniform distribution from feed trough 14. Feed trough 14, can, for this purpose, instead of being provided with a centrally located slot 15, also be provided with lateral apertures that are uniformly distributed along its longitudinal direction. The vibrating components of the reactor do not necessarily have to be subjected to continuous vibration. It is also possible to operate the reactor in an intermittent mode, a form of operation that is desirable in many cases. As an example of intermittent operationa, bulk material 7, 7' is not caused to flow over feed trough 14 and distribution plate 16 by virtue of the continuous motion in feed trough 14 and distribution plate 16; rather motion is imparted to transfer trough 14 only in order to ensure the availability of a sufficient volume of bulk material. Next, distribution plate 16 can be set in motion in order to cause the movement of bulk material 7, 7' to travelling bed 6, 6'. It can therefore be contemplated that feed trough 14 and distribution plate 16, can be set into motion alternately by means of the same vibrating power source. It is advantageous if transfer plates 10 are set in vibrating motion simultaneously with distribution plate 16.

Figure 5:
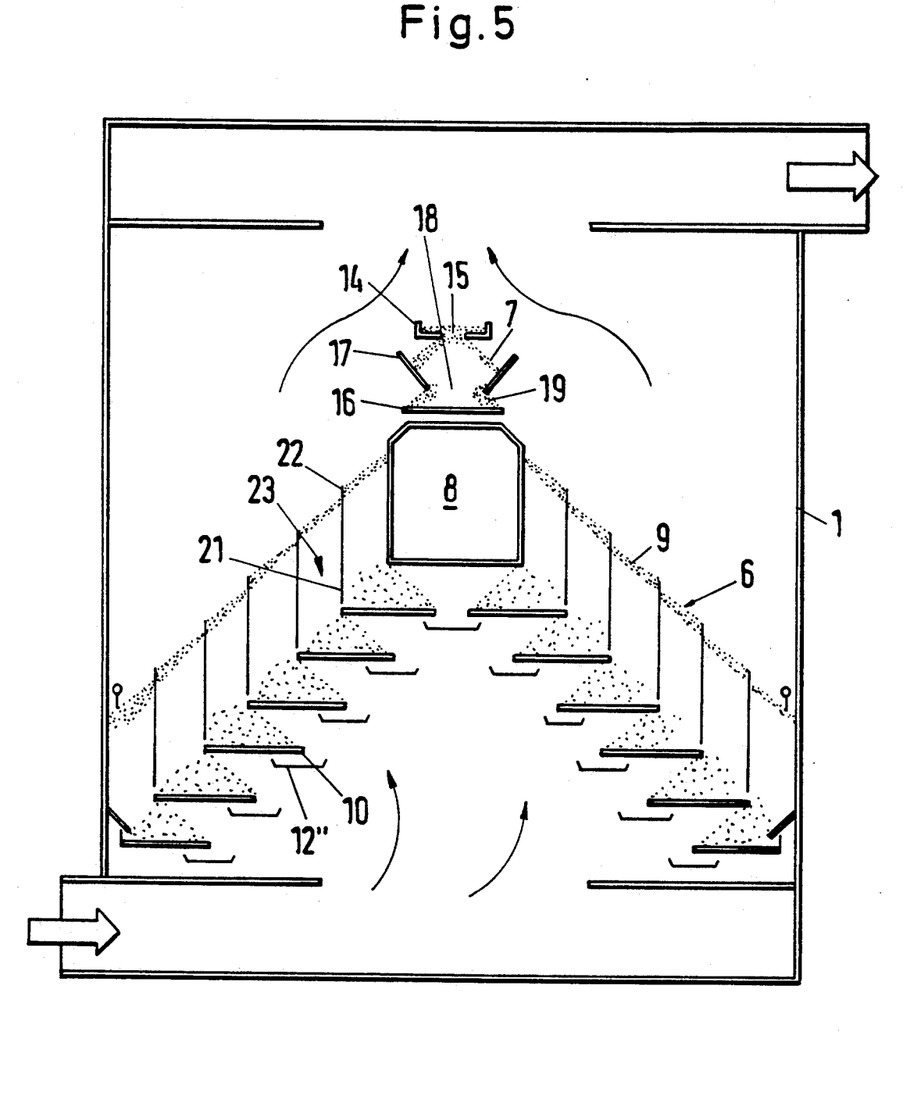
FIG. 5: a cross section through a reactor analogous to FIGS. 1 and 2, comprising dividing walls that are arranged above the transfer plates.

FIG. 5 shows a configuration example that corresponds to the configuration shown in FIGS. 1 and 2, with respect to feed device 14 to 18, and to transfer plates 10. Arranged analogously to the removal troughs 12' which are indicated in FIG. 2, are removal troughs 12" that are arranged in gradually overlapping fashion underneath the removal edges of transfer plates 10, and slope toward the walls of reactor housing 1. Arranged above the outer edge of each transfer plate 10 is one of a series of division walls 21, whose top edges form a connecting line that is sloped somewhat steeper than the angle of repose naturally assumed by bulk material 7. There is a very slight difference effectively because compartment 23 is the same height for all transfer plates 10.

The bulk material fed into the system through feed device 14 to 18, flows into both inner compartments 23, until the bulk material flows over top edge 22 of the corresponding dividing wall 21, to flow into adjacent compartment 23, until the latter is filled up, etc. The tendency of bulk material 7 to separate out along its path from feed device 14 to 18, down to the lower edge of travelling bed 6, is counteracted by a method of fitting compartment 23 involving use of dividing walls 21, which comprises that, when the inner compartments are filled with newly-entering bulk material, the latter will automatically spill over into the next compartment in such a manner that all of the grain sizes present in the bulk material will fill up such compartment.

Although the configuration examples shown in the drawings comprise a centrally located feed device 14 to 18, together with travelling beds 6 that slope away toward the sides of the reactor, it is also possible to install the feed device along the sides of reactor housing 1, and to arrange the travelling bed surfaces to slope away toward the middle of the reactor housing. Correspondingly therefore, transfer plates 10 slope gradually away from the walls of the reactor toward the inside of the housing.

Figure 6:
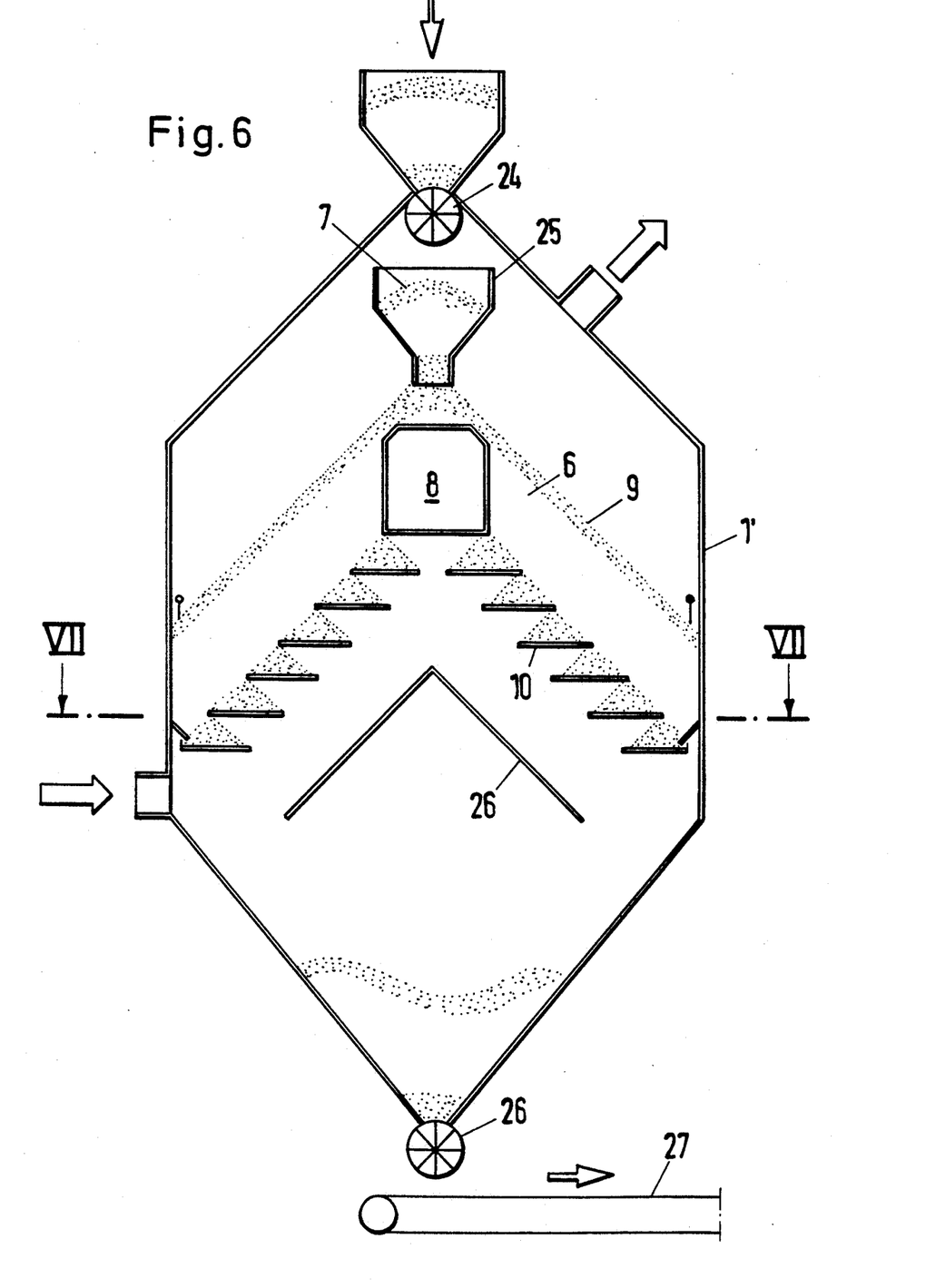
FIG. 6: a section through a modified version of the reactors shown in FIGS. 1, 2 and 5.
Figure 7:
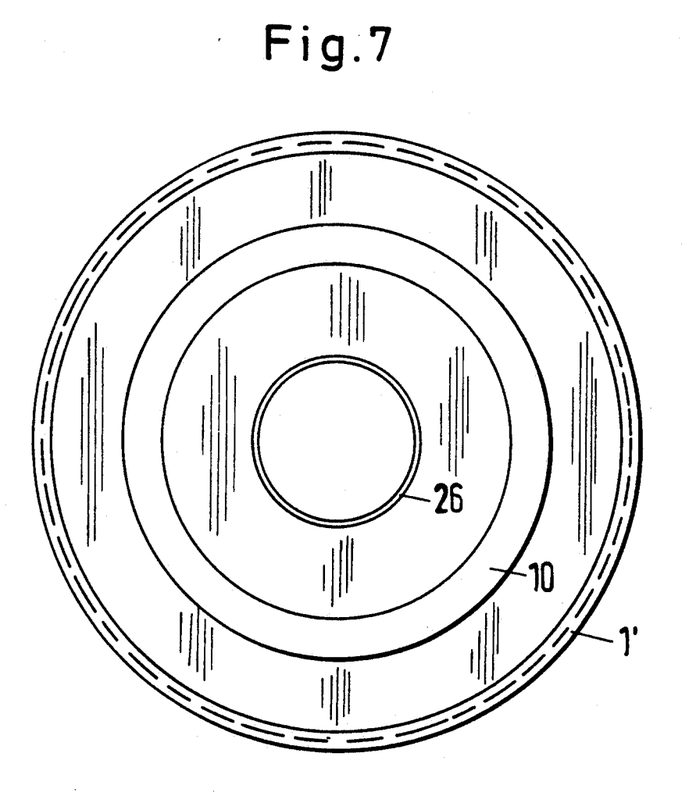
FIG. 7: a section running perpendicular to the sectional view shown in FIG. 5, along line VII—VII of FIG. 6.

FIG. 5 shows that surfaces 9 of travelling bed 6 are formed inside individual compartments 23, the angle of repose of which being somewhat flatter than the line connecting top edges 22 of division walls 21. The modified reactor 1', which is shown in FIGS. 6 and 7, features a rounded cross section, as shown in FIG. 7. Accordingly, transfer plates have an annular shape. In this configuration, transfer plates can preferably move forward and backward in the vertical direction, and can also be set in vibrating motion in the vertical direction.

A further modification of the reactor comprises that the bulk material be fed into the system through a star feeder 24, which feeds such material into a funnel 25, whose bottom-located outlet ends near the apex of travelling bed 6. Transfer plates 10 are arranged in a cascade-like formation that accords with the naturally developing angle of repose of the bulk material constituting surface 9. A V-shaped deflection plate 26, situated underneath transfer plates 10, serves to reduce the length of drop of the bulk material, and thus prevents damage to grainy bulk material 7. The floor of reactor 1' tapers funnel-like toward the bottom, at the end of which is located a further star feeder 26, which serves to distribute bulk material 7 in a consistent manner on top of a conveyor system 27. The proposed design for bulk material reactor 1, 1' is suitable for reactors having round and angular cross sections. A variety of feed and removal systems can be designed for bulk material 7. The bidirectional motion of transfer plates 10, which serves to facilitate the trickling out of bulk material 7, can be effected in both the horizontal and the vertical direction.

I claim:

1. Bulk material reactor comprising a travelling bed of bulk material which is arranged inside a reactor housing together with a feed device located on a top side and a removal device located on an underside of said travelling bed, said reactor housing including an inlet opening and an outlet opening for the purpose of respectively letting gas into and out of said reactor, whereby said travelling bed is bounded along its lower side by means of cascade-forming staggered plates that overlap toward side walls of said reactor, whereby plates 10 can be arranged at a height from each other and to overlap each other such that an angle of repose 11 is formed by bulk material 7, 7' upon plates 10, said angle of repose serving to prevent bulk material 7, 7' from trickling out while the reactor is stopped, and whereby plates 10 are connected to a vibration power source which enables bulk material 7, 7' to fall from said plates due to the motion of said plates and whereby plates 10 are situated along a sloped line that runs parallel to a sloping surface 9 of travelling bed 6, 6';

whereby a feed trough 14 extends over the depth of reactor housing 1, and is provided with at least one opening therein;

whereby feed trough 14 is set into motion by means of a vibrating power source.

2. Bulk material reactor in accordance with claim 1, whereby the plates 10 can be moved back and forth in their longitudinal direction.

3. Bulk material reactor in accordance with claim 1, whereby the travelling bed 6, 6' has a symmetrical design comprising two sloping areas located on the surface of said travelling bed, and whereby two groups of plates 10 are arranged in a similarly symmetrical fashion and each group of plates slope away in a cascade formation toward the walls of reactor housing 1.

4. Bulk material reactor in accordance with claim 3, whereby a central piece 8, 8' divides travelling bed 6, 6'.

5. Bulk material reactor in accordance with claim 4, whereby the width of central piece 8, 8' permits formation upon uppermost plate 10 of an angle of repose 11 that is approximately equal to the angle of repose formed upon lower-situated top plates 10.

6. Bulk material reactor comprising a travelling bed of bulk material which is arranged inside a reactor housing together with a feed device located on a top side and a removal device located on an underside of said travelling bed, said reactor housing including an inlet opening and an outlet opening for the purpose of respectively letting gas into and out of said reactor, whereby said travelling bed is bounded along its lower side by means of cascade-forming staggered plates that overlap toward side walls of said reactor, whereby plates 10 can be arranged at a height from each other and to overlap each other such that an angle of repose 11 is formed by bulk material 7, 7' upon plates 10, said angle of repose serving to prevent bulk material 7, 7' from trickling out while the reactor is stopped, and whereby plates 10 are connected to a vibration power source which enables bulk material 7, 7' to fall from said plates due to the motion of said plates and whereby plates 10 are situated along a sloped line that runs parallel to a sloping surface 9 of travelling bed 6, 6';
whereby a feed trough 14 extends over the depth of reactor housing 1, and is provided with at least one opening therein;
whereby arranged underneath feed trough 14 is a distribution plate 16, arranged above said feed through are lateral guide plates 17 which permit, during process stoppage, the formation of a complete angle of repose 19 on top of said distribution plate 16, and whereby said distribution plate 16 can, furthermore, be set in motion by means of a vibrating power source.

7. Bulk material reactor comprising a travelling bed of bulk material which is arranged inside a reactor housing together with a feed device located on a top side and a removal device located on an underside of said travelling bed, said reactor housing including an inlet opening and an outlet opening for the purpose of respectively letting gas into and out of said reactor, whereby said travelling bed is bounded along its lower side by means of cascade-forming staggered plates that overlap toward side walls of said reactor, whereby plates 10 can be arranged at a height from each other and to overlap each other such that an angle of repose 11 is formed by bulk material 7, 7' upon plates 10, said angle of repose serving to prevent bulk material 7, 7' from trickling out while the reactor is stopped, and whereby plates 10 are connected to a vibration power source which enables bulk material 7, 7' to fall from said plates due to the motion of said plates and whereby plates 10 are situated along a sloped line that runs parallel to a sloping surface 9 of travelling bed 6, 6';
wherein removal troughs 12, 12' are arranged in at least two planes and are provided with intermediate spaces 13, whereby removal trough 12, 12' which are located on all planes, overlap each other along the extent of the plates 10.

8. Bulk material reactor in accordance with claim 7, whereby removal plates 12' are staggered in sloping fashion underneath transfer plates 10, so as to correspond to the slope of the staggering of transfer plates 10.

9. Bulk material reactor in accordance with claim 7, whereby removal troughs 12, 12' are set into vibrating motion.

10. Bulk material reactor in accordance with claim 7, wherein the plates 10 are arranged in such a manner so as to slope in a cascade-like formation toward a wall of said reactor housing 1, and whereby the sloping surface 9 of said travelling bed similarly slopes towards the wall of said reactor housing 1.

11. Bulk material reactor comprising a travelling bed of bulk material which is arranged inside a reactor housing together with a feed device located on a top side and a removal device located on an underside of said travelling bed, said reactor housing including an inlet opening and an outlet opening for the purpose of respectively letting gas into and out of said reactor, whereby said travelling bed is bounded along its lower side by means of cascade-forming staggered plates that overlap toward side walls of said reactor, whereby plates 10 can be arranged at a height from each other and to overlap each other such that an angle of repose 11 is formed by bulk material 7, 7' upon plates 10, said angle of repose serving to prevent bulk material 7, 7' from trickling out while the reactor is stopped, and whereby plates 10 are connected to a vibration power source which enables bulk material 7, 7' to fall from said plates due to the motion of said plates and whereby plates 10 are situated along a sloped line that runs parallel to a sloping surface 9 of travelling bed 6, 6';
whereby arranged above plates 10, along the width of reactor housing 1, one beside the other, are vertical dividing walls 21 each having a top edge, the dividing walls being arranged such that an imaginary line connecting the respective top edges of the dividing walls to each other is disposed at an angle relative to the side walls of the reactor to aid the formation of the sloping surface 9 of travelling bed 6.

12. Bulk material reactor in accordance with claim 11, whereby the imaginary line that connects the top edges 22 of dividing walls 21 has a steeper slope than the angle of repose which is naturally formed by bulk product 7, 7'.

13. Bulk material reactor in accordance with claim 11, whereby a compartment 23, which is bounded by at least one division wall 21, is created for each plate 10.

14. Bulk material reactor, comprising a travelling bed of bulk material which is arranged inside a reactor housing together with a feed device located on a top side and a removal device located on an underside of said travelling bed, said reactor housing including an inlet opening and an outlet opening for the purpose of respectively letting gas into and out of said reactor, whereby said travelling bed is bounded along its lower side by means of cascade-forming staggered plates that overlap toward side walls of said reactor, whereby plates 10 can be arranged at a height from each other and to overlap each other such that an angle of repose 11 is formed by bulk material 7, 7' upon plates 10, said angle of repose serving to prevent bulk material 7, 7' from trickling out while the reactor is stopped, and whereby plates 10 are connected to a vibration power source which enables bulk material 7, 7' to fall from said plates due to the motion of said plates and whereby plates 10 are situated along a sloped line that runs parallel to a sloping surface 9 of travelling bed 6, 6';

whereby the plates 10 are sloped relative to the horizontal.

15. Bulk material reactor comprising a travelling bed of bulk material which is arranged inside a reactor housing together with a feed device located on a top side and a removal device located on an underside of said travelling bed, said reactor housing including an inlet opening and an outlet opening for the purpose of respectively letting gas into and out of said reactor, whereby said travelling bed is bounded along its lower side by means of cascade-forming staggered plates that overlap toward side walls of said reactor, whereby plates 10 can be arranged at a height from each other and to overlap each other such that an angle of repose 11 is formed by bulk material 7, 7' upon plates 10, said angle of repose serving to prevent bulk material 7, 7' from trickling out while the reactor is stopped, and whereby plates 10 are connected to a vibration power source which enables bulk material 7, 7' to fall from said plates due to the motion of said plates and whereby plates 10 are situated along a sloped line that runs parallel to a sloping surface 9 of travelling bed 6, 6'; whereby the slope of the plates 10 can be adjusted.

16. Bulk material reactor in accordance with claim 15, whereby the plates are set into bidirectional motion in the vertical direction.

17. Bulk material reactor in accordance with claim 1, whereby the cross section of reactor 17', is round.

* * * * *